United States Patent
Bunn

(10) Patent No.: US 7,512,169 B2
(45) Date of Patent: Mar. 31, 2009

(54) METHOD AND SYSTEM FOR PRODUCING SINGLET DELTA OXYGEN (SDO) AND LASER SYSTEM INCORPORATING AN SDO GENERATOR

(75) Inventor: Thomas L. Bunn, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/673,336

(22) Filed: Feb. 9, 2007

(65) Prior Publication Data

US 2008/0192793 A1   Aug. 14, 2008

(51) Int. Cl.
*H01S 3/095* (2006.01)

(52) U.S. Cl. .................. 372/89; 372/38.06; 372/44.01

(58) Field of Classification Search ............ 372/89, 372/38.06, 44.01
See application file for complete search history.

(56) References Cited

U.S. PATENT DOCUMENTS

| 6,674,781 | B1 * | 1/2004 | Dickerson et al. ............. 372/89 |
| 6,690,707 | B1 * | 2/2004 | Dering et al. ................. 372/89 |
| 2003/0035458 | A1 * | 2/2003 | Neumann et al. ............. 372/89 |

* cited by examiner

*Primary Examiner*—Dung T Nguyen
(74) *Attorney, Agent, or Firm*—Charles L. Moore; R. Brian Drozd; Moore & Van Allen, PLLC

(57) ABSTRACT

A method for producing singlet delta oxygen may include forming a molecular beam of oxygen clusters from oxygen from an oxygen source. The method may also include optically pumping the molecular beam of oxygen clusters to produce singlet delta oxygen.

37 Claims, 3 Drawing Sheets

METHOD AND SYSTEM FOR PRODUCING SINGLET DELTA OXYGEN (SDO) AND LASER SYSTEM INCORPORATING AN SDO GENERATOR

BACKGROUND OF THE INVENTION

The present invention relates to producing singlet delta oxygen (SDO), laser systems and the like, and more particularly to a method and system for producing singlet delta oxygen and a laser system, such as an oxygen iodine laser (OIL) system or similar system.

The Chemical Oxygen Iodine Laser (COIL) is noted for possessing scalable high power with good beam quality at a wavelength well tuned for atmospheric propagation. However, the COIL technology is tainted by the necessity for noxious, caustic, cryogenic, energetic and unstable chemical fuels. In addition to storage, logistics and complexity concerns, operation of such lasers may be too slow in weapons systems to hit fast moving targets in a defensive capacity. Additionally, singlet delta oxygen (SDO, $O_2(^1\Delta)$), the energy source that turns on COIL lasers, is generated via a liquid-gas reaction which may be too slow for quick response under some circumstances.

BRIEF SUMMARY OF THE INVENTION

In accordance with an embodiment of the present invention, a method for producing singlet delta oxygen may include forming a molecular beam of oxygen clusters from oxygen from an oxygen source. The method may also include optically pumping the molecular beam of oxygen clusters to produce the singlet delta oxygen or a singlet delta oxygen flow or stream.

In accordance with another embodiment of the present invention, a method for producing singlet delta oxygen may include forming a molecular beam of oxygen clusters from oxygen from an oxygen source. The method may also include exciting the oxygen clusters to produce singlet delta oxygen. The method may further include using the singlet delta oxygen to perform one of a group including generating a laser beam, bleaching an object, disinfecting an object, and decontaminating an object.

In accordance with another embodiment of the present invention, a method for generating a laser beam may include forming a molecular beam of oxygen clusters from oxygen from an oxygen source. The method may also include optically pumping the molecular beam of oxygen clusters to produce a flow of singlet delta oxygen. The method may further include entraining the singlet delta oxygen flow with iodine to form a laser gain medium for generating the laser beam.

In accordance with another embodiment of the present invention, a system for producing singlet delta oxygen may include a structure to form a molecular beam of oxygen clusters from oxygen from an oxygen source. The method may also include an optical pump to create a singlet delta oxygen flow from the molecular beam of oxygen clusters.

In accordance with another embodiment of the present invention, a laser system may include a structure to form a molecular beam of oxygen clusters. The laser system may also include an optical pump to create a singlet delta oxygen flow from the molecular beam of oxygen clusters. The laser system may further include an iodine injection source to entrain the singlet delta oxygen flow with iodine to form a laser gain medium for generating the laser beam.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1:
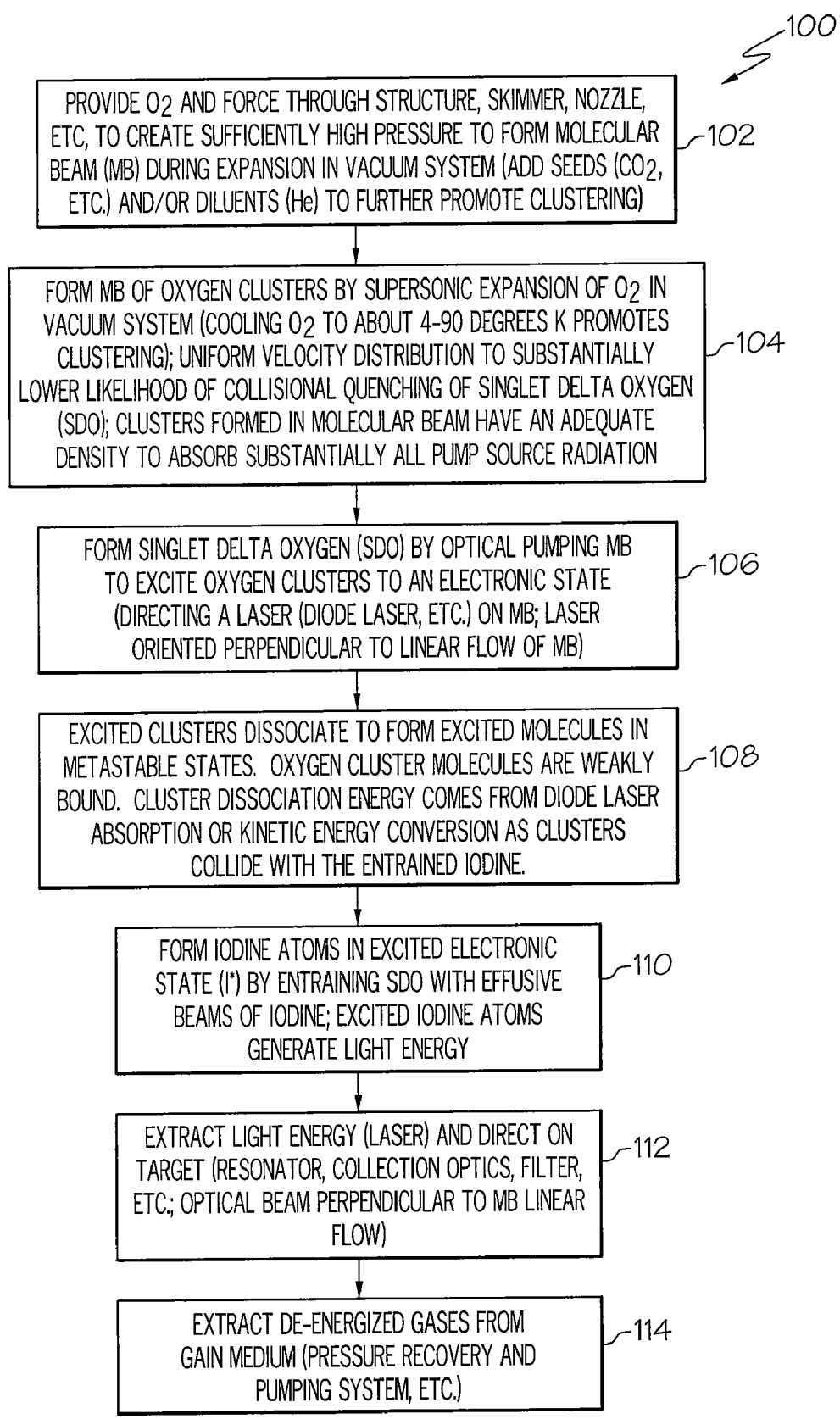
FIG. 1 is a flow chart of an example of a method for producing singlet delta oxygen (SDO) and generating a laser beam using the SDO in accordance with an embodiment of the present invention.

FIG. 1 is a flow chart of an example of a method 100 for producing singlet delta oxygen (SDO) and generating a laser beam using the SDO in accordance with an embodiment of the present invention. In module or block 102, oxygen ($O_2$) may be provided from an oxygen source and forced through a structure to create a predetermined pressure that is sufficiently high to form a molecular beam (MB) of oxygen clusters during expansion of the oxygen molecules. The structure may be a skimmer, nozzle, venturi or other structure or element capable of causing supersonic expansion of the oxygen in a vacuum system or chamber similar to that described herein. The structure may also form an opening into the vacuum system or chamber.

In an embodiment of the present invention, a seed and/or diluent may be added to the oxygen to further promote clustering of the oxygen molecules during expansion, as described in block 102. Seed molecules, such as carbon dioxide ($CO_2$) or similar gases capable of providing nucleation sites, may enable cluster formation. Diluents, for example a monatomic diluent, such as helium (He), may transfer oxygen's internal energy into translational energy enabling cluster formation.

In block or module 104, a molecular beam of oxygen clusters may be formed by supersonic expansion of the oxygen in the vacuum chamber or system. Supersonic expansions or free jets freeze translation and internal degrees of freedom in the molecular beam leading to condensation or cluster formation. A molecular beam of oxygen may be cooled by gas dynamic cooling to below about 90 degrees Kelvin (K) to further promote clustering. The condensation temperature for liquid oxygen is about 90 degrees Kelvin. Oxygen clusters may be defined as clusters of oxygen molecules having two or more molecules (dimers, trimers, etc.). Cluster molecules possess similar physical and chemical properties of aerosols and liquids containing the same element.

While the present invention is described with respect to forming oxygen clusters, other embodiments of the present invention may utilize any gaseous element or compound capable of forming a molecular beam of clusters when undergoing supersonic expansion or the like.

The molecular beam may also be formed to have a uniform velocity distribution to substantially lower the likelihood of collisional quenching of singlet delta oxygen (SDO) when formed. As a result of the uniform velocity distribution, the environment of the oxygen molecules within the molecular beam may be substantially collision-free until iodine is introduced into the flow as described herein. The structural opening into the vacuum system may be shaped to substantially provide the uniform velocity distribution of the molecular beam in addition to facilitating the supersonic expansion. The molecular beam may define a supersonic stream or flow of oxygen clusters within the vacuum system or chamber having a substantially uniform velocity distribution within the chamber.

The molecular beam may also be characterized by having a predetermined density of oxygen clusters so that substantially all of the optical pump source radiation may be absorbed by the molecular beam as described below. Additionally, the oxygen clusters may have a predetermined adsorption cross-section sufficient to absorb substantially all of the optical pump radiation.

In module or block 106, singlet delta oxygen (SDO) may be formed. The SDO may be formed by optically pumping oxygen clusters within the molecular beam or by any other means to excite the clusters to an excited electronic state. An excited electronic state is defined as an electron promoted into a molecular orbital energy level higher than that of the ground state.

The molecular beam may be optically pumped by directing a laser beam, such as a diode laser beam or beam from another type laser source capable of exciting the oxygen clusters to the excited electronic state. Accordingly, the oxygen clusters may be excited by diode laser absorption. Other methods of exciting internal energy states of clusters in a supersonic molecular beam may include but are not necessarily limited to electric or microwave discharge, electron or particle beams, other energy exchange reactions or interactions or similar techniques. The laser beam or other means may be oriented substantially perpendicular to linear flow of the molecular beam for optimum absorption of the optical pump radiation.

A diode pumped laser utilizes a low quality light source, typified by diode lasers, to excite a gain medium so that a high quality laser beam can be extracted through the use of an optical resonator as described herein. The value of good beam quality is superior energy propagation and a tighter far-field focus.

At this stage, in other embodiments of the present invention, the SDO may be used for other purposes than generating a laser beam as described further with respect to the method 100. For example, the SDO may be used in a cleaning or bleaching process to clean or bleach an object; in a disinfecting process to disinfect an object; in a decontamination process to decontaminate an object; or other processes or systems where SDO may be used.

In block 108, excited oxygen cluster dissociate to form excited molecules in metastable states. Oxygen cluster molecules are weakly bound. Cluster dissociation energy comes from diode laser absorption or kinetic energy conversion as clusters collide with the entrained iodine. Metastable molecules are defined as molecules possessing internal energy above that of the ground state and this energy decays slowly. Singlet Delta Oxygen (SDO) or $O_2(^1\Delta)$ is a metastable state of oxygen characterized by having a very long radiative lifetime, i.e., about 45 minutes.

In module or block 110, the SDO stream may be entrained with effusive beams of iodine to form iodine atoms in an excited electronic state (I*). The SDO is reacted with the iodine by supersonic mixing. As is well understood in chemical oxygen-iodine lasers (COILs), SDO molecules dissociate diatomic iodine molecules ($I_2$) into iodine atoms (I). Subsequent Iodine atom and SDO collisions result in an energy transfer to excite ground state Iodine atoms ($^2P_{3/2}$) to a spin-orbit electronic state ($^2P_{1/2}$). The excited state iodine atoms make up the gain medium which when surrounded by an optical resonator produces stimulated emission and generates a laser beam having a wavelength of 1.319 μm. Thus, excited cluster molecules are dissociated into metastable molecules (SDO) that "flow" energy to another region of an apparatus, such as the system 300 in FIG. 3, where the SDO can be deposited into other gaseous media ($I_2$, I) to form a laser gain media.

Excited clusters that dissociate into excited atoms or molecules that result in a population inversion (more excited states than ground states) may become a gain medium that shares a mode volume with the pump radiation. In this scenario, there may be no requirement to transfer energy to the iodine.

In module or block 112, light energy or the laser beam may be extracted from the laser gain medium and directed onto an object or target. An optical resonator, collection optics, filters or other devices similar those used with chemical oxygen iodine lasers (COIL) may be used to extract the laser beam from the laser gain medium and to direct the laser beam onto an object or target. The optical beam or laser beam may be extracted perpendicular to the linear flow of the SDO-I stream.

In module or block 114, the de-energized gases may be extracted or removed from the laser gain medium by a pressure recovery and pumping system or system similar to that used with respect to COILs. Heat build up in a gain medium is often cited as the cause of a laser's poor beam quality. In a flowing gas phase laser, such as the one described, waste heat never builds up in the gaseous gain medium as it would in a solid state medium because the de-energized gases may be pumped away. The de-energized gas flows out of the gain medium at a rate that depends on or corresponds to the velocity of the molecular beam.

Figure 2:
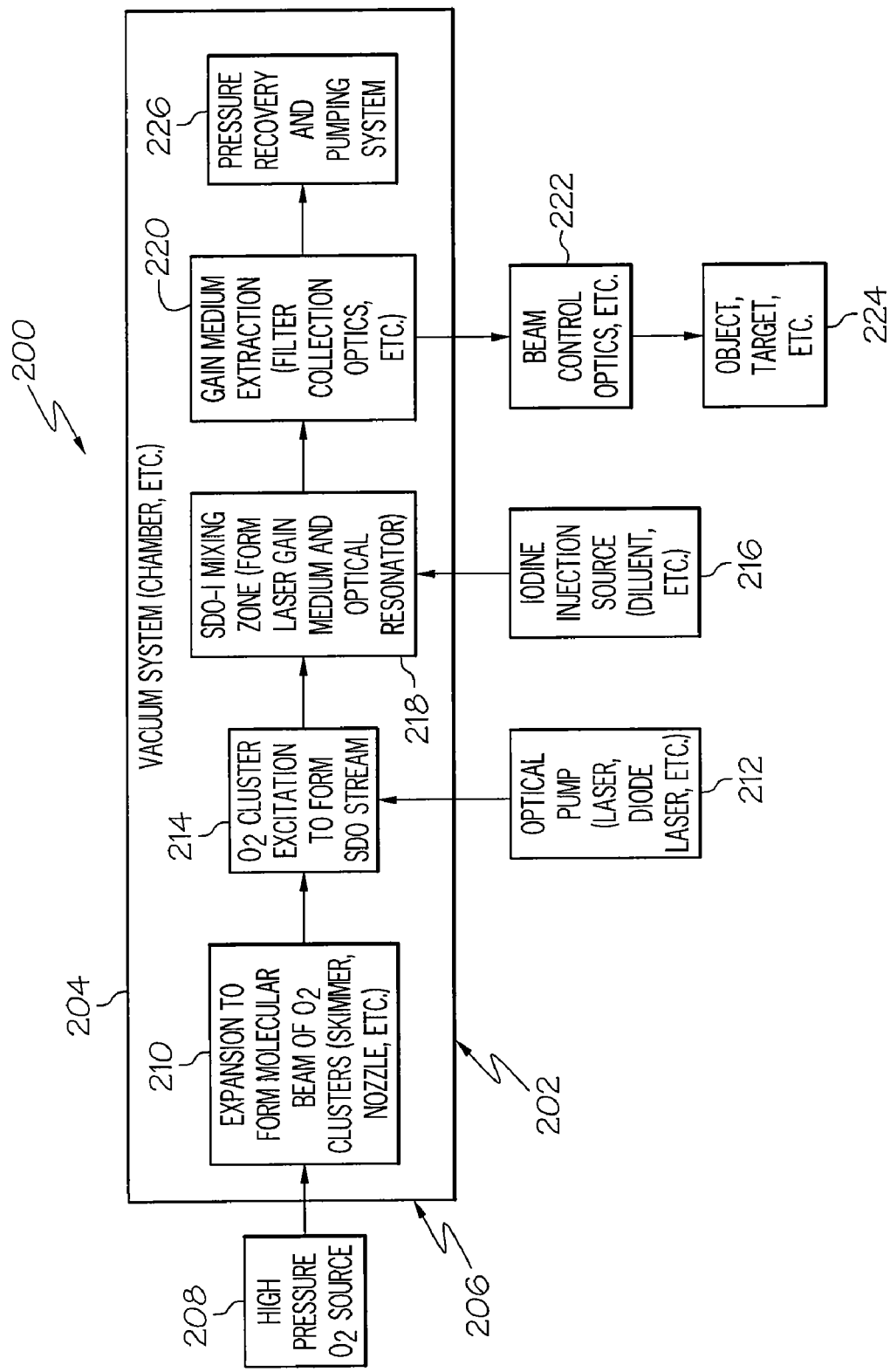
FIG. 2 is a block diagram of an exemplary laser system including a system for producing SDO in accordance with another embodiment of the present invention.

FIG. 2 is a block diagram of an exemplary laser system 200 including a system for producing SDO 202 in accordance with an embodiment of the present invention. The system 200 may include a vacuum system 204 or chamber. An entrance or input to the vacuum chamber 204 may have a structure 206 to cause supersonic expansion of oxygen from an oxygen source 208 to form a molecular beam of oxygen clusters 210. The oxygen source 208 may be high pressure oxygen source to force the oxygen through the structure 206 to cause supersonic expansion of the oxygen molecules to form the molecular beam of oxygen clusters 208. The structure 206 may be a skimmer, nozzle, venturi or similar structure to cause supersonic expansion of the oxygen molecules.

An optical pump or light source 212 may be directed on the molecular beam of oxygen clusters 208 to cause excitation of the oxygen molecules and formation of singlet delta oxygen or a flow of singlet delta oxygen 214 from the molecular beam of oxygen clusters 210. The optical pump 212 may be a diode laser or any type of laser or other energy form capable of exciting the oxygen clusters 210 to form the singlet delta oxygen stream 214.

The system 200 may also include an iodine injection source 216 to entrain the singlet delta oxygen stream 214 with iodine to form a laser gain medium 218. The iodine injection source 216 may include a manifold or similar arrangement to entrain the singlet delta oxygen flow 218 with at least one effusive beam of iodine in a singlet delta oxygen-iodine (SDO-I) mixing zone to form the laser gain medium 218. Injection of the iodine into the SDO flow or stream 218 reacts to create iodine atoms in an excited electronic state similar to that previously described. A diluent may also be injected with the iodine to enable flow and enhance mixing of the iodine with the SDO flow. The diluent may be a monatomic, such as helium or a diatomic such as nitrogen.

The laser gain medium 218 may include an optical resonator or other devices for enhancing the power of a laser beam created by the laser gain medium 218. A gain medium extractor 220 may extract the laser beam from the laser gain medium and resonator 218. The gain medium extractor 220 may include collection optics, filters or other apparatus to extract the laser beam from the laser gain medium 218. Beam control optics 222 may control focusing or directing the laser beam on an object or target 224.

As previously discussed, after the laser beam has been generated in the laser gain medium 218 by de-energizing the excited iodine atoms, de-energized gases flow out of the laser gain medium 218. The de-energized gases flow out of the laser gain medium 218 at a rate that depends on the velocity of the molecular beam. These de-energized gases may be removed by a pressure recovery and pumping system 226. The pressure recovery and pumping system 226 may be similar to that used on COILs. The pressure recovery and pumping system 226 may provide a better quality laser beam with less jitter than solid state lasers because maintaining the flow of gases in the laser gain medium 218 substantial eliminates any heat build up in the system 200.

The pressure recovery and pumping system 226 may also involve a sealed exhaust system. Unlike conventional COILs, no halogens or water vapor would be trapped in the sealed exhaust system making it more readily regenerated and in less time on board a weapon platform or vehicle, such as aerospace vehicle, terrestrial vehicle, watercraft or other type vehicle.

Further, the laser system 200 of the embodiment of the present invention illustrated in FIG. 2 may be more efficient because no water vapor is introduced into the gain medium 218. In conventional COI lasers, water vapor formed as part of the SDO generation process can quench or suppress the energy of the excited or energized iodine atoms.

Figure 3:
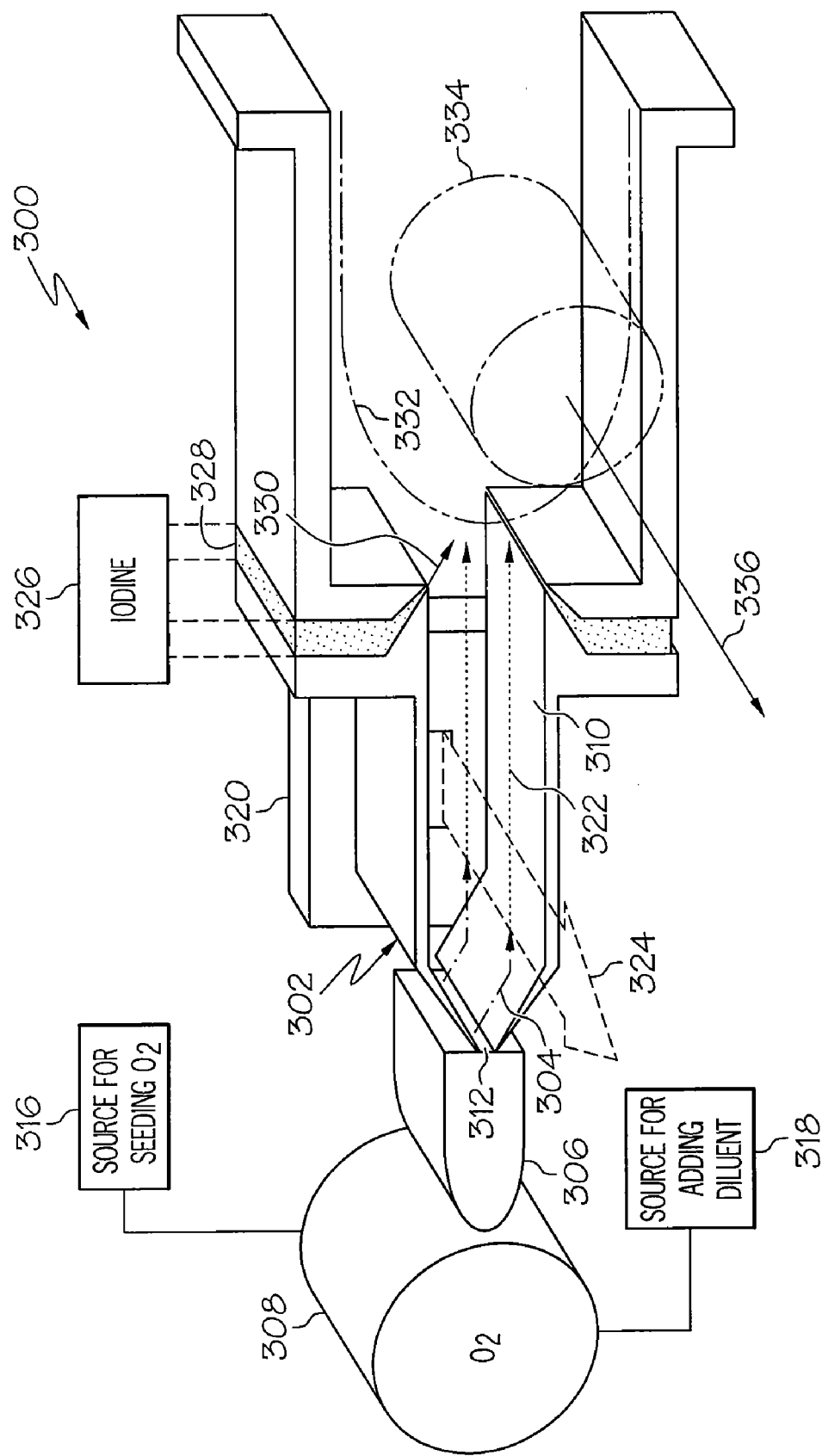
FIG. 3 is an illustration of an exemplary system or apparatus for producing SDO in accordance with an embodiment of the present invention.

FIG. 3 is an illustration of an exemplary system 300 or apparatus for producing SDO in accordance with an embodiment of the present invention. The system 300 may include a structure 302 to form a molecular beam of oxygen clusters 304 from oxygen 306 from an oxygen source 308. The structure 302 may include a vacuum system or chamber 310 The structure 302 may include an entrance element 312, such as a skimmer 312, nozzle, or other formation, to cause supersonic expansion of the oxygen 306 to form the molecular beam of oxygen clusters 304. The structure 302 and entrance element 312 may be adapted to provide a substantially uniform velocity distribution of the molecular beam 304 to substantially prevent any self or collisional quenching or suppression of the singlet delta oxygen. Thus, a substantially collision-free environment is provided for the oxygen molecules until iodine is introduced into the flow as previously described.

The oxygen may be cooled by gas dynamic supersonic expansion of the oxygen to between about 4 degrees Kelvin and about 90 degrees Kelvin to promote clustering. A further advantage of low temperatures is that lower concentrations of SDO are required to achieve an Iodine atom population inversion when the iodine and SDO streams are mixed and reacted.

The system 300 may also include a source for seeding the oxygen 316 to promote clustering. As previously described, the oxygen 306 may be seeded with carbon dioxide or any gas or substance that may promote clustering of the oxygen molecules to form the molecular beam 304.

The system 300 may also include another source for adding a diluent 318 to the oxygen 306 to also promote clustering. As previously discussed, the diluent may be a monatomic diluent, such as helium or the like that efficiently absorbs the internal energies of oxygen and converts it to translational energy thereby promoting condensation.

The system 300 may also include an optical pump 320 or other mechanism to excite the oxygen molecules in the molecular beam of oxygen clusters 304 and to thereby create a flow or stream of singlet delta oxygen (SDO) 322. The optical pump 320 may be a laser, diode laser or the like to generate a laser beam 324 to be directed on the molecular beam 304 to excite the oxygen molecules to an excited electronic state. The laser beam 324 may be directed on the molecular beam 304 substantially perpendicular to the flow of the molecular beam 304. The excited oxygen cluster molecules 304 disassociate into metastable molecules (SDO 322) that "flow" energy to another region 325 of the system 300 where the SDO 322 may be deposited into other gaseous media ($I_2$, I) to form a laser gain medium as described below.

The system 300 may also include an iodine ($I_2$ or I atom) injection source 326 to entrain the singlet delta oxygen flow 322 with iodine. The iodine injection source 326 may include a manifold 328 to entrain the singlet delta oxygen flow 322 or stream with at least one effusive beam of iodine 330 to form a laser gain medium 332 for generating a laser beam. The laser gain medium 332 may include an optical resonator 334 and other components to facilitate extraction of energy and generate a laser beam 336. The generated laser beam 336 may be substantially perpendicular to the linear flow of the SDO 322.

From the foregoing, those skilled in the art will recognize that the embodiments of the present invention may provide an optically pumped molecular beam oxygen iodine laser with many advantages over chemical oxygen iodine lasers or similar lasers. For example, the laser system of the embodiments of the present invention may be powered by electricity rather than by chemicals or noxious, caustic, cryogenic, possibly unstable chemical fuels. The laser system of the present invention is less complicated than conventionally powered COILs. The laser magazine may be deeper than conventionally powered COILs. Magazine depth may be limited only by the pumping speed (and capacity) of a vacuum producing system such as a sealed exhaust system.

The laser system of the present invention may be more easily readied for operation. Chemical regeneration is not necessary with the embodiments of the laser system of the present invention previously described.

The laser system of the embodiments of present invention may also be more efficient, thus lighter, because significantly higher SDO yields may be achievable at higher pressures. Thus facilitating deployment of embodiments of the present invention on a vehicle, such as an aircraft, terrestrial vehicle or watercraft.

The laser system of the present invention may also be more efficient because no water vapor is introduced into the gain medium. As previously described, water vapor can quench the energy in the energized iodine atoms.

A response to "call for fire" or operation may be shorter compared to conventionally fueled COIL because in the latter, liquid pump loops and gas flow require several seconds to become established before lasing can be initiated.

The output laser beam of the present invention may also have less jitter than conventionally powered COILs. Conventionally fueled COILs require pump loops and fluid flows which may be a major source of beam jitter.

The flowcharts and block diagrams in the Figures illustrate the architecture, functionality, and operation of possible implementations of systems and methods according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for producing singlet delta oxygen for a laser system, comprising:
   forming a molecular beam of oxygen clusters from oxygen from an oxygen source by causing supersonic expansion of the oxygen; and
   optically pumping the molecular beam of oxygen clusters to produce the singlet delta oxygen (SDO) after the molecular beam of oxygen clusters are formed.

2. The method of claim 1, further comprising forcing the oxygen through a structure to create a predetermined pressure to form the molecular beam.

3. The method of claim 1, further comprising at least one of seeding the oxygen and adding a diluent to promote clustering.

4. The method of claim 1, further comprising adding at least one of carbon dioxide ($CO_2$) and helium (He) to the oxygen to promote clustering.

5. The method of claim 1, further comprising gas dynamically cooling the oxygen to promote clustering.

6. The method of claim 1, further comprising cooling the oxygen to between about 4 degrees Kelvin and about 90 degrees Kelvin to promote clustering.

7. The method of claim 1, further comprising providing a uniform velocity distribution of the molecular beam to substantially prevent a likelihood of the singlet delta oxygen collisionally quenching.

8. The method of claim 1, further comprising forming the molecular beam with a predetermined density to absorb substantially all optical pump source radiation.

9. The method of claim 1, wherein optical pumping comprises directing a laser beam on the molecular beam of oxygen clusters to excite the oxygen clusters to a state to produce a singlet delta oxygen flow.

10. The method of claim 1, further comprising reacting the SDO with entrained iodine molecules ($I_2$) to dissociate $I_2$ forming iodine atoms (I).

11. The method of claim 1, further comprising interacting Iodine atoms interact with the SDO to form excited Iodine atoms (I*).

12. The method of claim 1, further comprising forming iodine atoms in an excited state to form a laser gain medium for generating a laser beam.

13. The method of claim 1, further comprising entraining iodine atoms into the singlet delta oxygen to cause the iodine atoms to enter an excited state, wherein the iodine atoms in the excited state are capable of generating a laser beam when de-energizing and wherein a de-energized gas remains after the excited iodine atom are de-energized.

14. The method of claim 13, further comprising extracting the laser beam and directing the laser beam on a target.

15. The method of claim 14, further comprising extracting the de-energized gases from a laser gain medium.

16. The method of claim 1, further comprising one of generating a laser beam, or bleaching, disinfecting or decontaminating an object using the singlet delta oxygen.

17. A method for producing singlet delta oxygen, comprising:
   forming a molecular beam of oxygen clusters from oxygen from an oxygen source by causing supersonic expansion of the oxygen;
   exciting the oxygen clusters to produce singlet delta oxygen after the molecular beam of Oxygen clusters are formed; and
   using the singlet delta oxygen to perform one of a group including generating a laser beam, bleaching an object, disinfecting an object, and decontaminating an object.

18. The method of claim 17, further comprising:
   forcing the oxygen under a predetermined pressure into a vacuum system.

19. The method of claim 17, further comprising at least one of seeding the oxygen with carbon dioxide and adding a diluent to promote clustering of the oxygen molecules.

20. The method of claim 17, wherein exciting the oxygen clusters comprises optical pumping the molecular beam.

21. The method of claim 17, wherein exciting the oxygen clusters comprises directing a laser beam from a diode laser on the molecular beam of oxygen clusters to excite the oxygen clusters to an electronic state to produce a singlet delta oxygen flow.

22. The method of claim 21, further comprising entraining iodine atoms into the singlet delta oxygen flow to form a gain medium for lasing.

23. The method of claim 17, further comprising entraining the singlet delta oxygen with iodine atoms to cause the iodine atoms to enter an excited electronic state forming a gain medium for lasing, wherein the iodine atoms in the excited electronic state are capable of providing a laser beam when de-energizing and wherein a de-energized gas flow out of the gain medium at a rate that depends on a velocity of the molecular beam.

24. A method for generating a laser beam, comprising:
   forming a molecular beam of oxygen clusters from oxygen from an oxygen source by causing supersonic expansion of the oxygen;

optically pumping the molecular beam of oxygen clusters to produce a flow of singlet delta oxygen after the molecular beam of oxygen clusters are formed;

entraining the singlet delta oxygen flow with iodine to form a laser gain medium for generating the laser beam.

25. The method of claim 24, further comprising cooling the oxygen within a predetermined temperature range to promote clustering.

26. The method of claim 24, wherein optical pumping comprises directing a diode laser beam on the molecular beam of oxygen clusters to excite the oxygen clusters to produce the singlet delta oxygen flow.

27. The method of claim 24, further comprising forming iodine atoms in an excited electronic state in response to entraining the singlet delta oxygen flow with at least one effusive beam of iodine, to generate the laser beam.

28. A system for producing singlet delta oxygen, comprising:
    a structure to form a molecular beam of oxygen clusters from oxygen from an oxygen source, wherein the structure causes supersonic expansion of the oxygen; and
    an optical pump to create a singlet delta oxygen flow from the molecular beam of oxygen clusters after the molecular beam of oxygen clusters are formed by the structure.

29. The system of claim 28, further comprising a source to at least one of seed the oxygen and add diluent to promote clustering.

30. The system of claim 28, wherein the structure is adapted to provide a uniform velocity distribution of the molecular beam to substantially prevent collisional quenching of the singlet delta oxygen.

31. The system of claim 28, wherein the optical pump comprises a diode laser.

32. The system of claim 28, further comprising a manifold to entrain the singlet delta oxygen flow with at least one effusive beam of iodine to form a laser gain medium for generating the laser beam.

33. A laser system, comprising:
    a structure to form a molecular beam of oxygen clusters by causing supersonic expansion of the oxygen;
    an optical pump to create a singlet delta oxygen flow from the molecular beam of oxygen clusters after the molecular beam of oxygen clusters are formed; and
    an iodine injection source to entrain the singlet delta oxygen flow with iodine to form a laser gain medium for generating the laser beam.

34. The laser system of claim 33, further comprising laser beam control optics to control directing the laser beam on a target.

35. The laser system of claim 33, wherein the structure comprises a vacuum chamber.

36. The laser system of claim 33, further comprising a pressure recovery and pumping system to pull de-energized gases out of the laser gain medium.

37. The laser system of claim 33, further comprising a vehicle, wherein the laser system is mounted to the vehicle.

* * * * *